United States Patent [19]

Nagai et al.

[11] Patent Number: 5,193,776

[45] Date of Patent: Mar. 16, 1993

[54] MECHANISM FOR LOCKING ANGULAR MOVEMENT OF SUCTION PAD

[75] Inventors: Shigekazu Nagai; Tadasu Kawamoto; Shuuzou Sakurai; Akio Saitoh, all of Ibaraki, Japan

[73] Assignee: SMC Kabushiki Kaisha, Tokyo, Japan

[21] Appl. No.: 770,350

[22] Filed: Oct. 3, 1991

[30] Foreign Application Priority Data

Oct. 5, 1990 [JP] Japan ................................. 2-104997
Nov. 9, 1990 [JP] Japan ................................. 2-118088

[51] Int. Cl.⁵ ............................................. B65H 3/08
[52] U.S. Cl. ............................. 248/295.1; 248/309.3; 271/90; 294/64.1
[58] Field of Search .................. 248/363, 205.5, 295.1, 248/309.3; 294/64.1, 64.3, 65; 269/21; 279/3; 271/90, 91, 103; 414/793, 797, 737, 752, 627

[56] References Cited

U.S. PATENT DOCUMENTS

| | | | |
|---|---|---|---|
| 2,995,359 | 8/1961 | Gulick | 271/103 |
| 3,107,794 | 10/1963 | Bechtold et al. | 414/797 X |
| 3,702,698 | 11/1972 | Schwebel | 271/103 |
| 3,834,558 | 9/1974 | Bru | 414/627 |
| 4,548,396 | 10/1985 | Nelen | 271/90 |
| 4,582,353 | 4/1986 | Alvernhe | |
| 4,640,503 | 2/1987 | Naumann | 271/103 |
| 4,728,135 | 3/1988 | Sugimura et al. | |
| 4,736,938 | 4/1988 | Jiruse et al. | 271/90 |

FOREIGN PATENT DOCUMENTS

| | | |
|---|---|---|
| 0223144 | 5/1987 | European Pat. Off. |
| 2316615 | 10/1973 | Fed. Rep. of Germany |
| 2542047 | 4/1976 | Fed. Rep. of Germany |
| 967058 | 8/1964 | United Kingdom |
| 2096577 | 10/1982 | United Kingdom |
| 2226548 | 7/1990 | United Kingdom |

Primary Examiner—David M. Purol
Attorney, Agent, or Firm—Oblon, Spivak, McClelland, Maier & Neustadt

[57] ABSTRACT

Disclosed herein is a mechanism for locking the angular movement of a suction pad. The mechanism comprises a tubular body fitted to a root part of the suction pad and having a flange; a cover member attached to a moving assembly for displacing the suction pad; a first bush having a slide resistance lower than the tubular body and fitted to the flange of the tubular body; and a second bush having a slide resistance lower than the cover member and fitted to the inside of the cover member. The first bush and second bush are engaged with each other in such a manner that alternating concavities and convexities of the first bush are meshed with alternating convexities and concavities of the second bush, respectively, whereby the displacement of the suction pad in its axial direction is guided, and the angular movement of the suction pad is prevented.

10 Claims, 8 Drawing Sheets

MECHANISM FOR LOCKING ANGULAR MOVEMENT OF SUCTION PAD

FIELD OF THE INVENTION

The present invention relates to a mechanism for locking the angular movement of a suction pad suitable for use in holding a work by suction to convey it.

DESCRIPTION OF THE PRIOR ART

In order to convey, for example, works in the form of a thin plate, there has heretofore been used suction pads connected to a vacuum and suction source. A suction pad of this kind is generally installed on an arm of a robot and utilized for the conveyance of works.

A suction pad according to the prior art will be described. To convey a work by the suction pad, the edge of a skirt part, which is thin and flexible, of the suction pad is first of all brought into contact with the work. A vacuum and suction source is then energized to suck air in the skirt part through a root part, a tubular body and a tube. Since the suction pad holds the work by suction under a pressure reducing effect within the skirt part, the work can be conveyed so long as an arm of a robot is displaced. Thereafter, compressed air is fed within the skirt part to release the negative pressure condition, thereby releasing the work from the suction pad.

In this case, the tube, which connects the vacuum and suction source and the tubular body to each other, is twisted due to the moving operation of the robot arm upon the conveyance, resulting in the angular movement of the tubular body, skirt part and work. However, such angular movement of the work is accompanied by disadvantages that difficulties are encountered on positioning of the work to a desired site in a desired posture, and the tube itself is damaged due to its torsion.

SUMMARY OF THE INVENTION

It is a general object of this invention to provide a mechanism for locking the angular movement of a suction pad, which can displace the suction pad smoothly toward a work, conduct its replacing operation with extreme ease and be easily produced.

It is a principal object of this invention to provide a mechanism for locking the angular movement of a suction pad, which has a tubular body engaging with the suction pad, smoothly guides and displaces the tubular body in its axial direction, and prevents the angular movement of the suction pad through the tubular body, thereby permitting the exact positioning of a work.

Another object of this invention is to provide a mechanism for locking the angular movement of a suction pad, in which a bush low in slide resistance is installed to a tubular body to which the suction pad is attached, while another bush, which is fitted on the first bush and is low in slide resistance, is installed to a cover member surrounding the tubular body, the bushes being engaged with each other so that the tubular body can be smoothly guided and displaced in its axial direction upon the holding of a work by suction and moreover, the work can be locked so as not to angularly move upon its conveyance, thereby permitting exact conveyance of the work to a target position without changing its posture and release of the work there.

A further object of this invention is to provide a mechanism for locking the angular movement of a suction pad, which comprises a tubular body fitted to a root part of the suction pad; a cover member attached to a moving means for displacing the suction pad; a first bush which has a slide resistance lower than the tubular body and is fitted to the tubular body; and a second bush which has a slide resistance lower than the cover member and is fitted to the inside of the cover member, the first bush and second bush being engaged with each other in such a manner that alternating concavities and convexities of the first bush are meshed with alternating convexities and concavities of the second bush, respectively, whereby the displacement of the suction pad in its axial direction is guided, and the angular movement of the suction pad is prevented.

Still a further object of this invention is to provide a mechanism for locking the angular movement of a suction pad, which comprises a tubular body fitted to a root part of the suction pad and having a flange; an annular body; and a member for the prevention of slipping-out, which is fitted to the tubular body and regulates the displacement range of the annular body, said tubular member being formed in the shape of a polygon in section, the annular body being formed by a synthetic resin in such a manner that its inner wall surface has a polygonal shape corresponding to the sectional form of the tubular body, and the tubular body being inserted through the annular body to mesh their polygonal portions with each other, whereby the displacement of the tubular body in the axial direction relative to the annular body is guided, and the angular movement of the suction pad is prevented.

Yet still a further object of this invention is to provide a mechanism for locking the angular movement of a suction pad, wherein a cushioning material is fitted to the annular body or at least part of the member for the prevention of slipping-out.

Yet still a further object of this invention is to provide a mechanism for locking the angular movement of a suction pad, which comprises a connecting part fitted to the suction pad and having a passage communicating with a suction source; and a sleeve fitted over the connecting part and serving to couple the connecting part to a moving mechanism for displacing the suction pad, the connecting part having a first engaging part at the outer peripheral surface thereof, and the sleeve having a second engaging part, which engages with the first engaging part, at the inner peripheral surface thereof, and a threaded part, which is connected to the moving mechanism, at the outer peripheral surface thereof.

Yet still a further object of this invention is to provide a mechanism for locking the angular movement of a suction pad, wherein the first and second engaging parts are composed respectively of grooves and projecting parts, which extend in the axial and circumferential directions of the connecting part.

Yet still a further object of this invention is to provide a mechanism for locking the angular movement of a suction pad, wherein the sleeve has a cutout over the whole length in its axial direction.

Other objects and advantages of the present invention will be readily appreciated from the preferred embodiments of this invention, which will be described subsequently in detail with reference to the accompanying drawings.

DETAILED DESCRIPTION OF THE PREFERRED EMBODIMENTS

Figure 1:
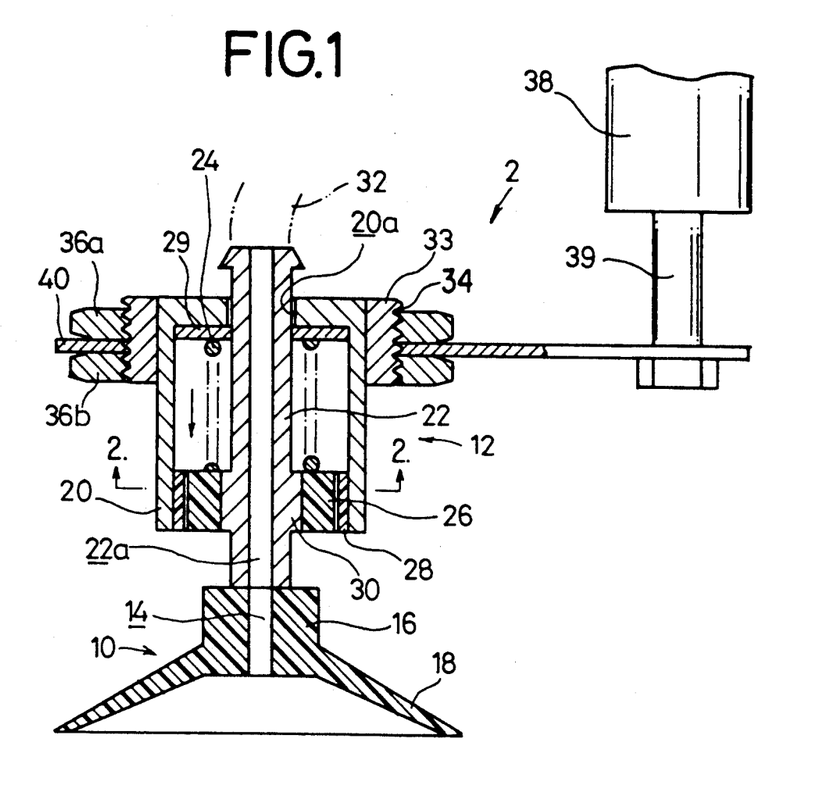
FIG. 1 is a vertical cross-sectional view of a mechanism for locking the angular movement of a suction pad, which has been fitted with the suction pad, according to the first embodiment of the present invention.

FIG. 1 illustrates a mechanism 12 for locking the angular movement of a suction pad 10 (hereinafter called "locking mechanism") according to the first embodiment of this invention. This suction pad 10 comprises a root part 16 having a hole 14 connected to a vacuum and suction source (not illustrated), and a skirt part 18 integrally extending from the root part 16. The locking mechanism 12 joined to the suction pad 10 basically comprises a cover member 20, a tubular body 22, a coil spring 24, a first bush 26 on the side of the tubular body 22 and a second bush 28 on the side of the cover member 20.

The tubular body 22, in which a through-hole 22a extending in its axial direction has been defined, has a flange 30 integrally formed at a somewhat upper portion from its lower end. The first bush 26 composed of a thermoplastic resin is fitted over this flange 30. As understood from FIG. 2, the first bush 26 is in the form of a circle having alternating concavities and convexities in vertical section.

Figure 2:
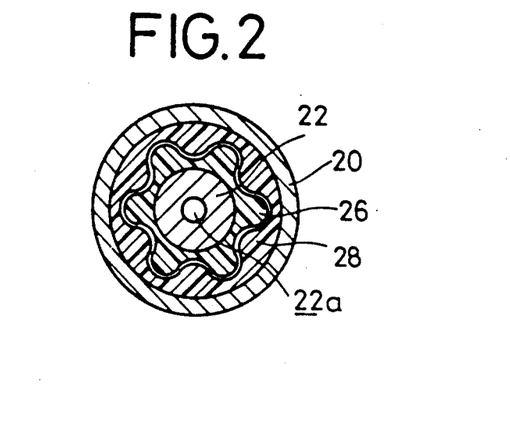
FIG. 2 is a cross-sectional view taken along the lines II—II of the locking mechanism illustrated in FIG. 1.

The cover member 20 substantially in the form of a cylinder is formed so as to have a wide opening on its lower side and to be closed on its upper side. The closed upper end has a hole 20a for receiving the upper end of the tubular body 22 in its center. Into the lower opening of the cover member 20, is fitted the second bush 28 in the form of a circle having alternating convexities and concavities corresponding to the concave convex form of the first bush 26. As with the first bush, the second bush 28 is also formed by a thermoplastic resin, preferably, a plastic. In view of the fact that the tubular body 22 and the cover member 20 are made of a metal, it is readily understood that both the first bush 26 and the second bush 28 are lower in slide resistance than the tubular body 22 and the cover member 20.

The coil spring 24 wounded around the tubular body 22 is seated on the cover member 20 at one end thereof and is engaged with the first bush 26 at the other end. Accordingly, the tubular body 22 is always biased through the first bush 26 in the direction illustrated by an arrow in FIG. 1. In this case, the upper end of the coil spring 24 in FIG. 1 is held by a ring member 29.

An annular body 33 is then fitted over the cover member 20. On an external thread 34 cut in the annular body 33, are screwed nuts 36a, 36b which fasten tightly an attaching plate 40 fitted to a cylinder rod 39 extending from a cylinder.

Figure 3:
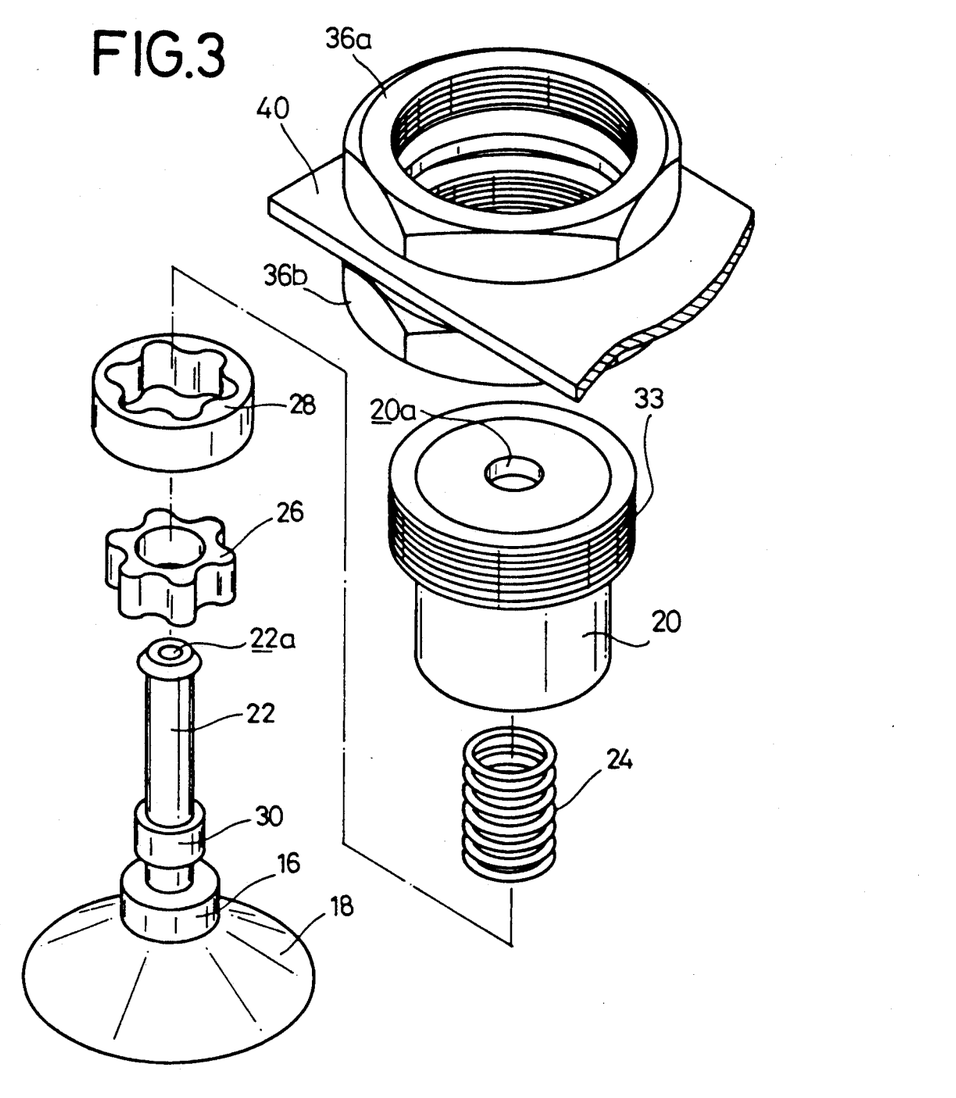
FIG. 3 is an exploded perspective view of the locking mechanism according to the first embodiment of the present invention.

The locking mechanism 12 according to the first embodiment of the present invention is basically constructed as described above. Its operation and effects will now be described with reference to FIGS. 1 through 3.

When the suction pad 10 is used in conveying operation, the cover member 20 is held by, for example, a robot hand (not illustrated). In this case, the through-hole 22a communicating with the hole 14 cut in the suction pad 10 is connected to a tube 32 communicating with a vacuum and suction source (not illustrated), and the vacuum and suction source is energized. When the cylinder 38 is then energized to hold a work by suction, the skirt part 18 is brought into contact with the work to suck air in the skirt part 18. The suction pad 10 holds the work by suction under a pressure reducing effect within the skirt part 18.

When the suction pad 10 comes into contact with the work, the coil spring 24 contracts owing to its cushioning effect. Therefore, the first bush 26 and the second bush 28 relatively slidable with respect to each other. In this embodiment, the bushes 26, 28 are composed of, for example, a thermoplastic resin molding having a smooth surface, a thermoplastic resin molding impregnated with an oil or a polytetrafluoroethylene-coated bush, and are thus highly slidable with respect to each other. Accordingly, it is not necessary to coat them with, for example, grease suitable for use in ensuring smooth displacement operation in the axial direction.

Thereafter, the work is conveyed under the displacement operation of the robot hand (not illustrated) which holds the cylinder 38. However, the tube 32 connecting the vacuum and suction source to the tubular body 22 is twisted by the moving operation of the hand, thereby forcing the angular movement of the tubular body 22 and the work. Alternately, the momental movement of the work itself, which is caused by the moving operation of the hand or arm, forces the work to turn. In this embodiment, as described above, the locking mechanism is however achieved upon the conveyance of the work by providing the first bush 26 on the tubular body 22 using the flange 30 and disposing the second bush 28 in the cover member 20 to mesh these bushes 26, 28 with each other. Therefore, it is possible to exactly convey the work and release it without changing its posture.

Figure 4:
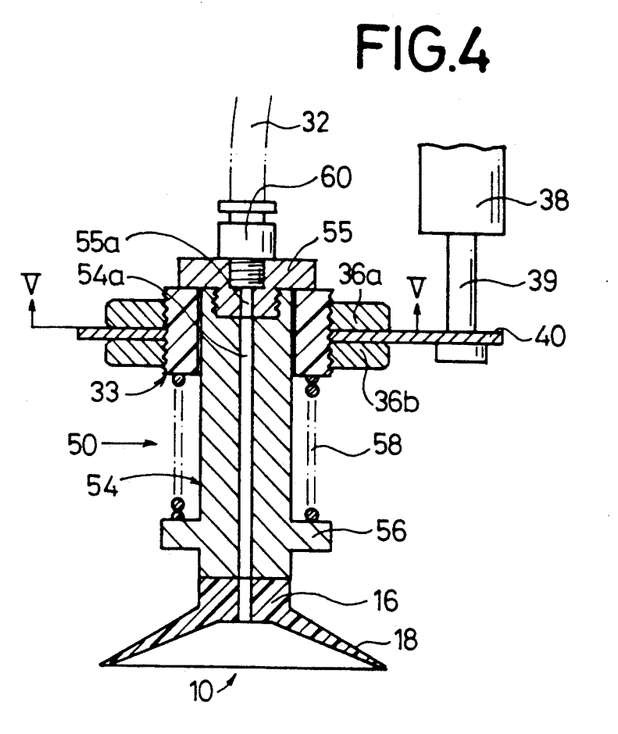
FIG. 4 is a vertical cross-sectional view of a mechanism for locking the angular movement of a suction pad according to the second embodiment of the present invention.
Figure 5:
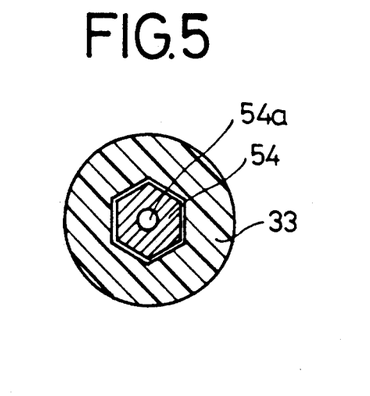
FIG. 5 is a cross-sectional view taken along the lines V—V of the locking mechanism illustrated in FIG. 4.

The second embodiment of this invention is illustrated in FIGS. 4 and 5. The, the same reference characters are given to the same constituent parts as those in the above-described embodiment, and their detailed description will be omitted.

A locking mechanism 50 for the suction pad according to this embodiment basically comprises a tubular body 54, a coil spring 58 wound up around the tubular body 54 from the top part of a flange 56 formed integrally with the tubular body 54, and an annular body 33, which is positioned above the coil spring 58 and on which one end of the coil spring 58 is seated. The root part 16 of the suction pad 10 is fitted to one end of the tubular body 54 by a means known per se in the art.

Namely, the tubular body 54, in which a throughhole 54a extending in its axial direction has been defined, has the flange 56 integrally formed at a somewhat upper portion from its lower end. As understood from FIG. 5, the tubular body 54 is formed into a polygon, in this embodiment, a hexagon in cross section.

In this embodiment, the annular body 33 is formed in such a manner that its inner wall surface is in a shape corresponding to the cross section of the tubular body 54, and is composed of a plastic.

To prevent the annular body 33 from slipping out of the tubular body 54, a member for the prevention of slipping-out 55, in which a hole 55a is defined, is fitted to the top of the tubular body 54, and a pipe joint 60 for connecting a tube 32 communicating with a vacuum and suction source is installed to the upper part of the member for the prevention of slipping-out 55.

Incidentally, the coil spring 58 wound around the tubular body 54 is engaged with the annular body 33 at one end thereof and with the flange 56 at the other end.

In the above-described construction, there is a potential problem that the tube 32 connecting the vacuum and suction source to the tubular body 54 is twisted by the moving operation of a cylinder 38 upon the conveyance of a work, thereby forcing the angular movement of a work through the tubular body 54 and the skirt part 18. Alternately, there is also a potential problem that the momental movement of the work itself, which is caused by the moving operation of the cylinder 38, forces the work to turn.

In this embodiment, however, since the cross sections of the tubular body 54 and the hole defined within the annular member 33 substantially correspond to each other, and there is hence little space therebetween, it is possible to prevent the angular movement, thereby exactly releasing the work from the suction pad 10 to a desired position without changing its posture.

Figure 6:
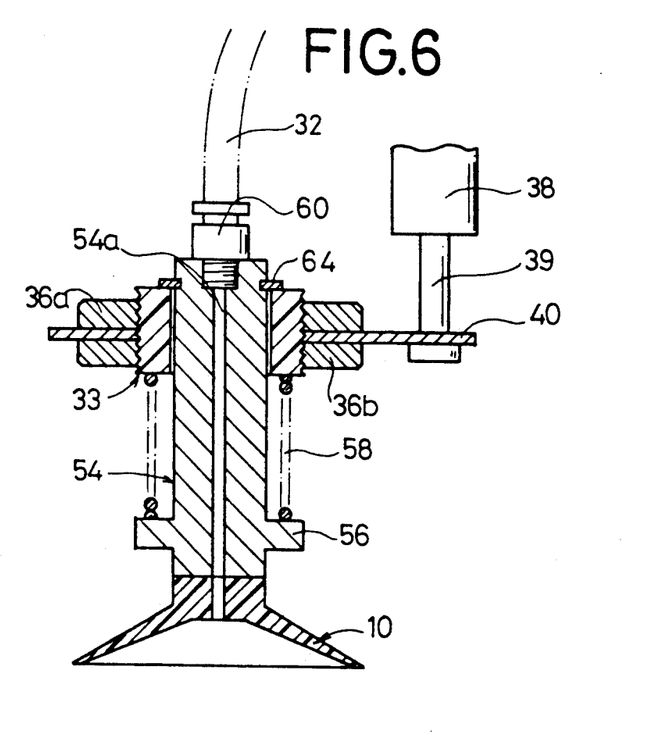
FIG. 6 is a vertical cross-sectional view of a mechanism for locking the angular movement of a suction pad according to the third embodiment of the present invention.
Figure 7:
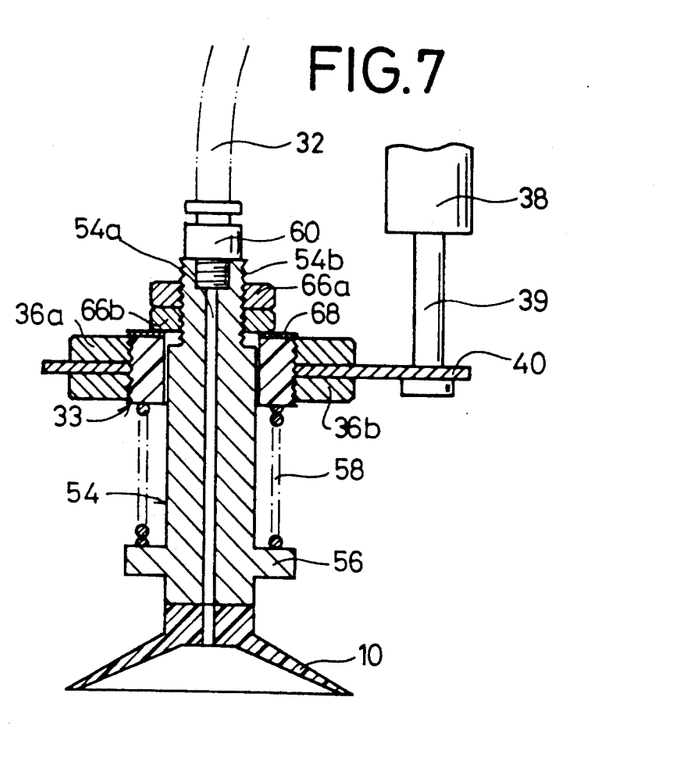
FIG. 7 is a vertical cross-sectional view of a mechanism for locking the angular movement of a suction pad according to the fourth embodiment of the present invention.

Other embodiments of this invention are illustrated in FIGS. 6 and 7.

In the third embodiment illustrated in FIG. 6, a ringlike groove is defined in the upper portion of a tubular body 54, and a ring 64 is inserted therein, thereby preventing an annular body 33 from slipping out of the tubular body 54. As a result, the structure of the mechanism can be made more simpler compared with those in the above-described embodiments.

In the fourth embodiment illustrated in FIG. 7, the upper part of a tubular body 54 is formed into a cylindrical shape thinner by one rank to cut an external thread 54b in its outer wall surface. Two nuts 66a, 66b are screwed on the external thread 54b, thereby preventing an annular body 33 from slipping out of the tubular body 54. In order to prevent the destruction of the annular body 33 made of a plastic due to a shock upon a collision of the nuts 66a, 66b against the annular body 33, a cushioning material 68 composed of a ring-like synthetic rubber is fitted to the top of the annular body 33.

This embodiment has an advantageous effect that the displacing length of the tubular body 54 can be controlled by, shifting the positions of the nuts 66a, 66b. It is also possible to fit the cushioning material 68 under the nuts 66a, 66b.

The tubular body 54 and the annular body 33 have been formed by a common plastic in a series of the embodiments described above. However, the use of those obtained by, for example, using a material impregnated with an oil or coating them with polytetrafluoroethylene has the effect of reducing the slide resistance upon the displacement of the tubular body 54 in its axial direction.

In addition to a series of the embodiments described above, it is also embraced in the present invention to form the annular body 33 by a conventional material and then insert a bush composed of a plastic inside such an annular body.

Then, the fifth embodiment of this invention is illustrated in FIGS. 8 through 11.

Figure 8:
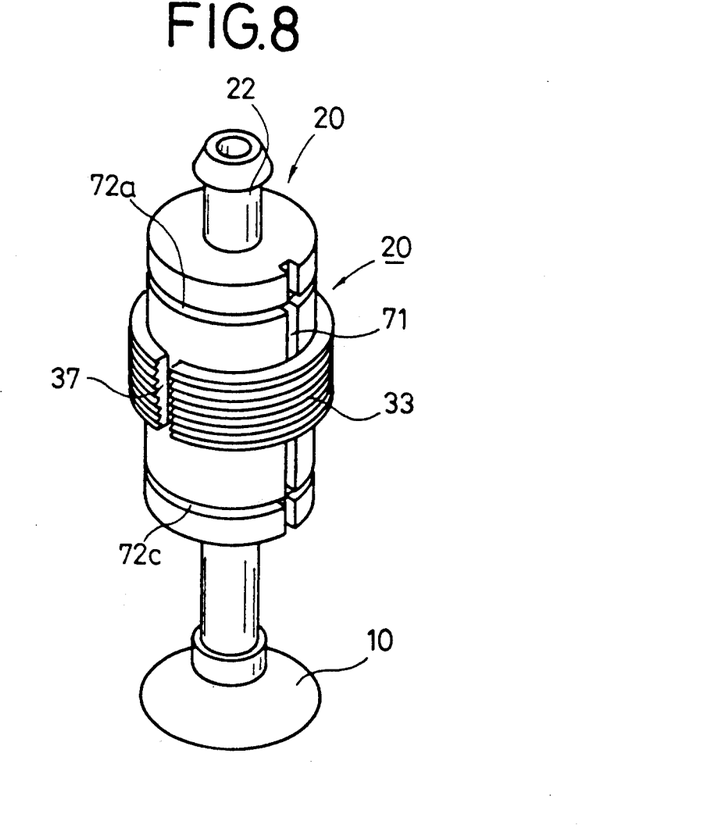
FIG. 8 is a perspective view of a mechanism for locking the angular movement of a suction pad according to the fifth embodiment of the present invention.
Figure 9:
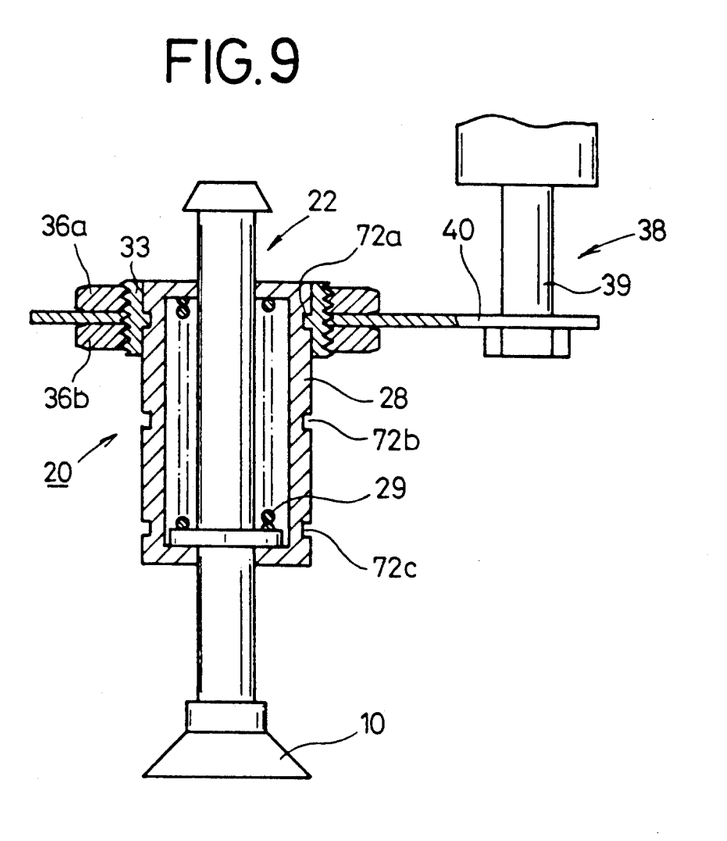
FIG. 9 is a cross-sectional view of the mechanism for locking the angular, movement of a suction pad according to the fifth embodiment of the present invention.

In this embodiment, a cover member 20 has, in its outer periphery, a groove 71 provided in its axial direction and grooves 72a, 72b, 72c provided in its circumferential direction.

Figure 10:
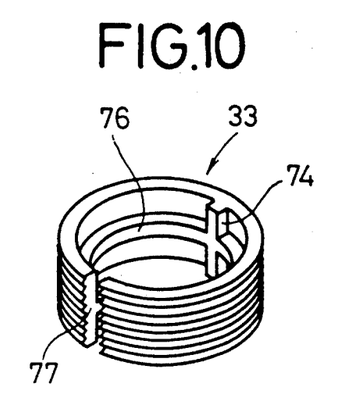
FIG. 10 is a perspective view of an annular body used in the locking mechanism according to the fifth embodiment.

As illustrated in FIGS. 8 and 10, an annular body 33 is fitted over the cover member 20 at a portion near the top thereof. A thread is cut in the outer peripheral surface of the annular body 33. On the inner peripheral surface thereof, projecting parts 74 and 76 are formed respectively in its axial and circumferential directions. The annular body 33 is further provided with a cutout 77 over the whole length in its axial direction.

After this annular body 33 is fitted over the cover member 20 in a state that the space of the cutout 77 has been widened (see FIG. 8), the projecting part 74 is fitted into the groove 71 by angularly moving the annular body 33, and the projecting part 76 is fitted into a desired groove 72a, 72b or 72c.

In this embodiment, the groove 71 in the cover member 20 is engaged with the projecting part 74 of the annular body 33, whereby relative turning in the circumferential direction is prevented. One of the grooves 72a through 72c is engaged with the projecting part 76, whereby the displacement in the axial direction is prevented.

The annular body 33 can be expanded by widening the space of the cutout 77, thereby permitting the displacement thereof in the axial direction to fit the projecting part 76 into a desired groove 72a, 72b or 72c. Therefore, it is not necessary to cut a thread in the whole surface of the cover member 20, so that the processing becomes easy.

Even when the replacement of parts are required due to difference in pitch of thread, or the like, it is only necessary to replace the annular body 33. Therefore, the material cost becomes cheap and the replacing operation is simplified.

Figure 11:
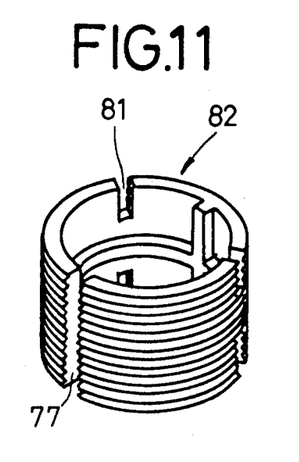
FIG. 11 is a perspective view of another annular body used in the locking mechanism according to the fifth embodiment.

An annular body 82 having partial cutouts 81 as illustrated in FIG. 11 may be used in place of the annular body 33. In this embodiment, it is desirable to use a flexible material such as a resin as a material for the annular bodies 33, 82.

According to the present invention, it is possible to achieve the function of locking the angular movement of the suction pad with ease by forming the annular body and the tubular body in such a manner that their sectional configurations correspond to each other. It is therefore possible to very accurately release the work through the suction pad to a desired position without changing a posture of the work upon its conveyance.

For this reason, the reliability on the conveyance of works in an automated factory can be enhanced.

Since the annular bodies according to the present invention are formed by a plastic, it is possible to achieve lowering in cost and reduction in weight compared with the case where the annular bodies are made up of a metallic material.

According to this invention, in addition, the first bush lower in slide resistance than the tubular body is fitted on the tubular body, while the second bush lower in slide resistance than the cover material is also fitted into the cover member so as to mesh the first and second bushes with each other, thereby permitting the displacement of the tubular body in the axial direction thereof. It is therefore possible to carry out the conveying operation of the work with good responsibility. With respect to these bushes, the use of those formed by, for example, using a thermoplastic resin impregnated with an oil or coating them with polytetrafluoroethylene, i.e., those formed by using a material having a lower slide resistance, also has a practical effect that there is no necessity of coating the contact surfaces of the bushes with grease or the like.

Furthermore, according to this invention, the annular body can be fitted to an optional position of the cover member. Even when pitches of threads and sizes of screws are different, it is only necessary to replace the annular body. Therefore, the material cost becomes cheap and the replacing operation is also simplified.

What is claimed is:

1. A mechanism for locking the angular movement of a suction pad, comprising:
    a rod having a through hole along the central axis thereof, an end of said rod being fitted to a root part of the suction pad, said through hole leading to a cavity of the suction pad, said rod having a flange near said end and a stopper at another end;
    a rod holder having a hole to receive said rod slidably in an axial direction of said rod between said flange and stopper and an inner surface facing an outer surface of said rod, said rod holder being attached to a moving means for displacing the suction pad;
    rotation prohibiting means for prohibiting said rod from rotating around the central axis thereof, said rotation prohibiting means being provided on the outer surface of said rod and the inner surface of said rod holder so as to engage with each other; and
    a cushioning member disposed around said rod and between said rod holder and flange.

2. The mechanism of claim 1, wherein:
    said rod is a tubular body having a round cross-section and a first bush fitted around said tubular body, said first bush having a periphery alternatingly concave and convex;
    said rod holder is a cover member cylindrically covering around a part of said tubular body, said cover member having an end plate at one end and a wide opening at the other end, said end plate having a round hole to receive said tubular body, said wide opening having a second bush fitted inside thereof, said second bush having an opening, with an inner periphery which is alternatingly concave and convex; and
    said rotation prohibiting means are said first and second bushes engaging with each other in a manner in which a concavity of said first bush meshes with a convexity of said second bush, and having a lower slide resistance between each other in an axial direction than a slide resistance that said tubular body and hole have between each other.

3. The mechanism of claim 2, wherein said cushioning member is a coil spring.

4. The mechanism of claim 2 or 3, wherein said first bush is fitted around the flange.

5. The mechanism of claim 4, wherein said first and second bushes are made of plastic.

6. The mechanism of claim 1, wherein:
    said rod is a tubular body having a polygonal cross-section;
    said stopper is a flange, having a diameter larger than the maximum diameter of said polygonal tubular body, screwed at an end of said tubular body opposite to the end where the suction pad is fitted;
    said rod holder is an annular body made of plastic;
    said hole is a polygonal hole on said annular body for receiving said polygonal tubular body and
    said rotation prohibiting means are the polygonal cross-section of said rod and the polygonal hole of said rod holder engaging with each other.

7. The mechanism of claim 6, wherein said tubular body has a circumferential groove on the surface near an end of the tubular body opposite to the end where the suction pad is fitted, and said stopper is a ring inserted in said groove.

8. The mechanism of claim 6 or 7, wherein:
    said rod is a connecting part having a round cross-section and a first engaging part on the outer surface thereof;
    said rod holder is a sleeve having a second engaging part on the inner surface thereof for engaging with the first engaging part, and a threaded part on the outer surface thereof for connecting said sleeve to the moving mechanism.

9. The mechanism of claim 8, wherein said first and second engaging parts are respectively grooves and projecting parts which extend in the axial and circumferential directions of the connecting part.

10. The mechanism of claim 8, wherein said sleeve has a cutout over the whole length in its axial direction.

* * * * *